United States Patent
Lin et al.

(10) Patent No.: US 8,121,643 B2
(45) Date of Patent: Feb. 21, 2012

(54) METHODS FOR INITIATING OPERATING VOLTAGES FOR SUBSCRIBER IDENTITY CARDS AND SYSTEMS UTILIZING THE SAME

(75) Inventors: Liu-Yang Lin, Tainan (TW); Chiang Hsia Huang, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 876 days.

(21) Appl. No.: 12/172,469

(22) Filed: Jul. 14, 2008

(65) Prior Publication Data

US 2009/0212908 A1 Aug. 27, 2009

Related U.S. Application Data

(60) Provisional application No. 61/031,769, filed on Feb. 27, 2008.

(51) Int. Cl.
*H04B 1/38* (2006.01)
(52) U.S. Cl. ...... 455/558; 455/552.1; 455/571; 455/572; 455/343.1; 235/486
(58) Field of Classification Search ........... 455/558, 455/552.1, 571, 572, 574, 343.1–343.4, 435.1–435.2; 235/486, 487, 449, 493; 717/101, 100, 148
See application file for complete search history.

(56) References Cited

U.S. PATENT DOCUMENTS

| | | | |
|---|---|---|---|
| 7,043,269 B2 * | 5/2006 | Ono et al. | 455/558 |
| 7,520,438 B2 * | 4/2009 | Kim et al. | 235/492 |
| 7,929,993 B2 * | 4/2011 | Nagarajan | 455/558 |
| 2006/0043202 A1 * | 3/2006 | Kim et al. | 235/492 |
| 2007/0004457 A1 * | 1/2007 | Han | 455/558 |
| 2008/0020765 A1 * | 1/2008 | Black et al. | 455/435.2 |
| 2009/0156258 A1 * | 6/2009 | Yang | 455/558 |

FOREIGN PATENT DOCUMENTS

CN 101005657 7/2007

OTHER PUBLICATIONS

English language translation of abstract of CN 101005657 (published Jul. 25, 2007).

* cited by examiner

*Primary Examiner* — Kamran Afshar
*Assistant Examiner* — Yousef Rod
(74) *Attorney, Agent, or Firm* — Thomas|Kayden

(57) ABSTRACT

A system for initiating operating voltages for subscriber identity cards is provided. The system includes a first subscriber identity card, a second subscriber identity card, an RF module, a controller and a Baseband unit. The controller initiates a first operating voltage of the first subscriber identity card and initiates a second operating voltage of the second subscriber identity, respectively. The Baseband unit cooperates with the first subscriber identity card to camp on a first cell and cooperates with the second subscriber identity card to camp on a second cell via the RF module.

20 Claims, 5 Drawing Sheets

METHODS FOR INITIATING OPERATING VOLTAGES FOR SUBSCRIBER IDENTITY CARDS AND SYSTEMS UTILIZING THE SAME

CROSS REFERENCE TO RELATED APPLICATIONS

This application claims the benefit of U.S. Provisional Application No. 61/031,769, filed Feb. 27, 2008, the entirety of which is incorporated by reference herein.

BACKGROUND OF THE INVENTION

1. Field of the Invention

The invention relates to a method for initiating a plurality of subscriber identity cards, and more particularly to a method for initiating operating voltages of the subscriber identity cards in a system.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. In addition, the General Packet Radio Service (GPRS) technology is one of the available technologies of a GSM network. The GPRS technology utilizes the unused channels in the GSM network to provide moderate speed data transmission. The Wideband Code Division Multiple Access (W-CDMA) is a wideband spread-spectrum mobile air interface that utilizes the direct-sequence spread spectrum method of asynchronous code division multiple access to achieve higher speeds and support more users compared to the implementation of time division multiplexing (TDMA) used by 2G GSM networks. Time Division-Synchronous Code Division Multiple Access (TD-SCDMA) is another type of 3G mobile telecommunications standard.

A dual SIM mobile phone is a phone with two Subscriber Identity Modules (SIMs), which correspond to different numbers. The dual SIM mobile phone allows a user to use two communication services without carrying two phones at the same time. For example, the same mobile phone may be used for business and private use with separate numbers and bills, thus providing convenience to mobile phone users. Typically, a SIM controller installed in the mobile phone drives two SIMs with a fixed voltage level. However, when the operating voltages of the installed SIM or Universal SIM (USIM) cards are different or the operating voltages of installed SIM/USIM cards are different from the driving voltage level, the (U)SIM cards malfunctions.

BRIEF SUMMARY OF THE INVENTION

Methods for initiating operating voltages of subscriber identity cards and the systems utilizing the same are provided. An embodiment of such a system comprises a first subscriber identity card, a second subscriber identity card, an RF module, a controller and a Baseband unit. The controller initiates a first operating voltage of the first subscriber identity card and initiates a second operating voltage of the second subscriber identity respectively. The Baseband unit cooperates with the first subscriber identity card to camp on a first cell and cooperates with the second subscriber identity card to camp on a second cell via the RF module.

Furthermore, an embodiment of a method for initiating operating voltages of a first subscriber identity card and a second subscriber identity card of a mobile station is provided. The mobile station further comprises a Baseband unit and an RF module. The Baseband unit is coupled to the first subscriber identity card, and a voltage variable signal is provided to the first subscriber identity card. A first code from the first subscriber identity card is received when the voltage variable signal is provided to the first subscriber identity card. A first operating voltage corresponding to the first code is provided to the first subscriber identity card. After the first operating voltage is provided, the Baseband unit is coupled to the second subscriber identity card and the voltage variable signal is provided to the second subscriber identity card. A second code from the second subscriber identity card is received when the voltage variable signal is provided to the second subscriber identity card. A second operating voltage corresponding to the second code is provided to the second subscriber identity card. The voltage variable signal is an analog signal with a first voltage level during a first time period and a second voltage level during a second time period, a voltage level of the first operating voltage is equal to the first or second voltage level, and a voltage level of the second operating voltage is equal to the first or second voltage level.

Moreover, another embodiment of a method for initiating operating voltages of a first subscriber identity card and a second subscriber identity card of a mobile station is provided. The mobile station further comprises a Baseband unit, a controller and an RF module. A first signal from the Baseband unit is provided to the controller via a first interface. A second interface of the Baseband unit is coupled to the first subscriber identity card by the controller after the first signal is provided. A voltage variable signal is provided to the first subscriber identity card by a first regulator of the controller when the second interface of the Baseband unit is coupled to the first subscriber identity card. A first code from the first subscriber identity card is received by the Baseband unit via the second interface when the voltage variable signal is provided to the first subscriber identity card. Voltage level settings are performed to the first regulator and a first level shifter according to the first code, wherein the first regulator and the first level shifter are coupled to the first subscriber identity card. A second signal from the Baseband unit is provided to the controller via the first interface after the voltage level settings of the first regulator and the first level shifter are completely performed. The second interface of the Baseband unit is coupled to the second subscriber identity card by the controller after the second signal is provided. The voltage variable signal is provided to the second subscriber identity card by a second regulator of the controller when the second interface of the Baseband unit is coupled to the second subscriber identity card. A second code from the second subscriber identity card is received by the Baseband unit via the second interface when the voltage variable signal is provided to the second subscriber identity card. Voltage level settings are performed to the second regulator and a second level shifter according to the second code, wherein the second regulator and the second level shifter are coupled to the second subscriber identity card. The voltage variable signal is an analog signal with a first voltage level during a first time period and a second voltage level during a second time period, and a voltage level of the first operating voltage is equal to the first or second voltage level, and a voltage level of the second operating voltage is equal to the first or second voltage level.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
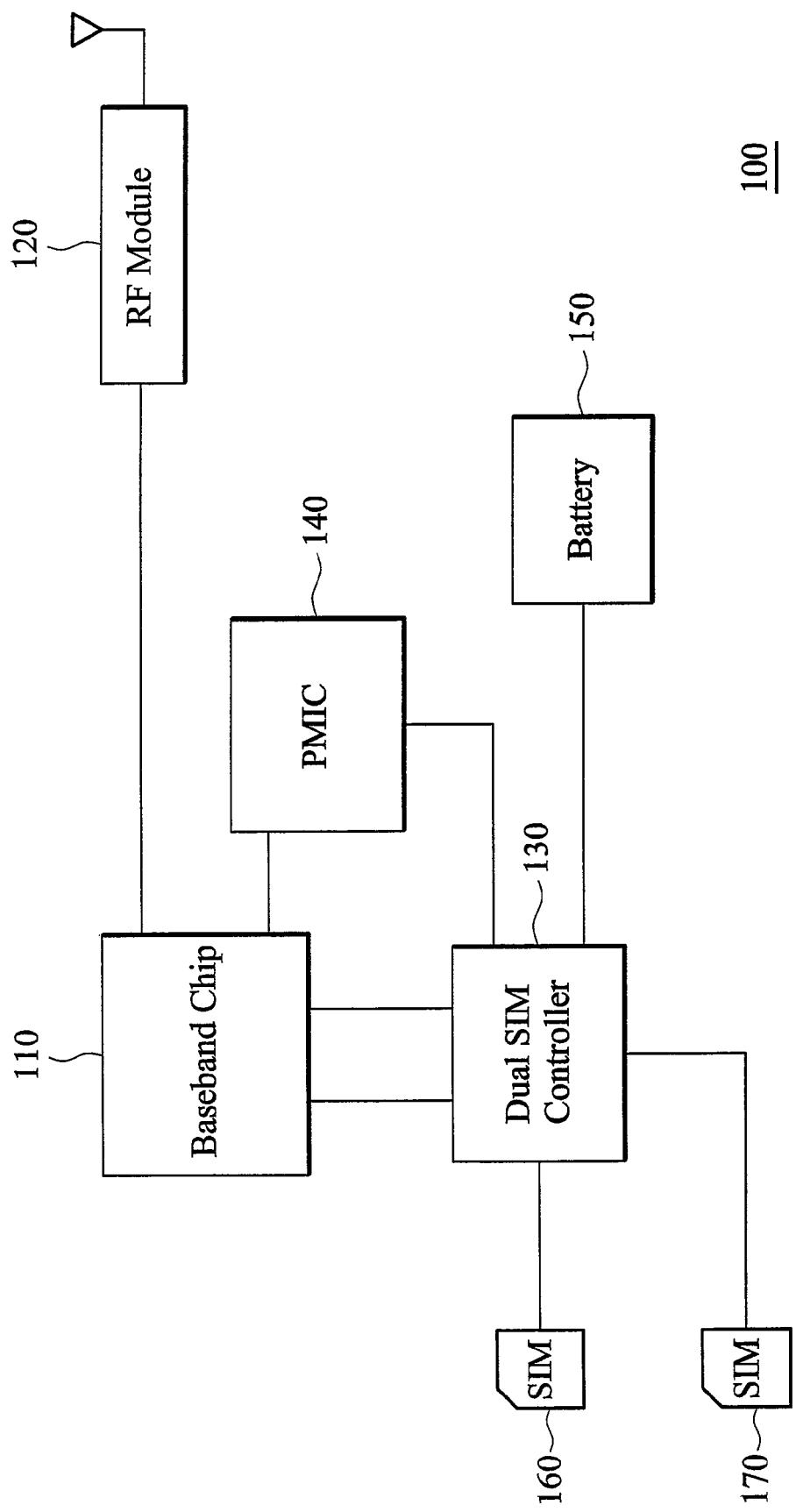
FIG. 1 shows a mobile station according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station is immediately programmed after plugging in the SIM card. SIM cards may also be programmed to display custom menus for personalized services.

A universal SIM (USIM) card is inserted in a mobile station for universal mobile telecommunications system (UMTS) (also called 3G) telephony communication. The USIM card stores user account information, an IMSI, authentication information and a set of USIM Application Toolkit (USAT) commands and provides storage space for text messages and phone book contacts. A Baseband MCU may interact with a MCU of the USIM card (each simply referred to as a USIM MCU hereinafter) to fetch data or SAT commands from the plugged in USIM cards. The phone book on the USIM card has been greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system. The IMSI is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), and are followed by the Mobile Network Code (MNC), either 2 digits (European standard) or 3 digits (North American standard). The remaining digits are the mobile subscriber identification number (MSIN) for a GSM or UMTS network user.

To reduce hardware costs, new mobile stations may be equipped with a single radio frequency (RF) module and Baseband chip respectively, and two subscriber identity cards may be plugged into two sockets of each mobile station connecting to the single Baseband chip, where each subscriber identity card is provided by a particular network operator. The subscriber identity card may be a SIM, USIM, R-UIM or CSIM card. The mobile station may therefore simultaneously camp on two cells provided by either the same network operator or different network operators for the plugged in SIM cards and operate in stand-by modes using the single RF module and Baseband chip. A dual SIM controller is coupled/connected between the Baseband chip and two SIM/USIM cards and powered by a power management integrated chip (PMIC) and a battery. The Baseband chip reads data from one of the SIM/USIM cards and writes data to one of the SIM/USIM cards via the dual SIM controller. The dual SIM controller powers the SIM/USIM cards with the same or different voltage levels according to requirements thereof, wherein the voltage level for each SIM/USIM card is determined during initiation. In general, the operating voltage level in a SIM/USIM card may be 1.8V or 3V In addition, the dual SIM controller selectively transfers the SIM/USIM clock, reset and data signals to the SIM/USIM cards according to instructions issued by the Baseband chip.

FIG. 1 shows a mobile station 100 according to an embodiment of the invention. The mobile station 100 comprises a Baseband chip 110, an RF module (or transceiver) 120, a dual SIM controller 130, a power management integrated chip (PMIC) 140, a battery 150 and two subscriber identity cards 160 and 170. As described above, the dual SIM controller 130 is coupled/connected between the Baseband chip 110 and the subscriber identity cards 160 and 170, and the dual SIM controller 130 is powered by the PMIC 140 and the battery 150. In the mobile station 100, the Baseband chip 110 may camp on a first cell corresponding to the subscriber identity card 160 and a second cell corresponding to the subscriber identity card 170 via the RF module 120, wherein the first and second cells may been provided by either the same network operator or different network operators. In some embodiments, the first and second cells are the same cell when the first and second cells correspond to two different numbers of the same network operator. Moreover, the Baseband chip 110 may read data from one of the subscriber identity cards 160 and 170 via the dual SIM controller 130, and also may write data to one of the subscriber identity cards 160 and 170 via the dual SIM controller 130.

Figure 2:
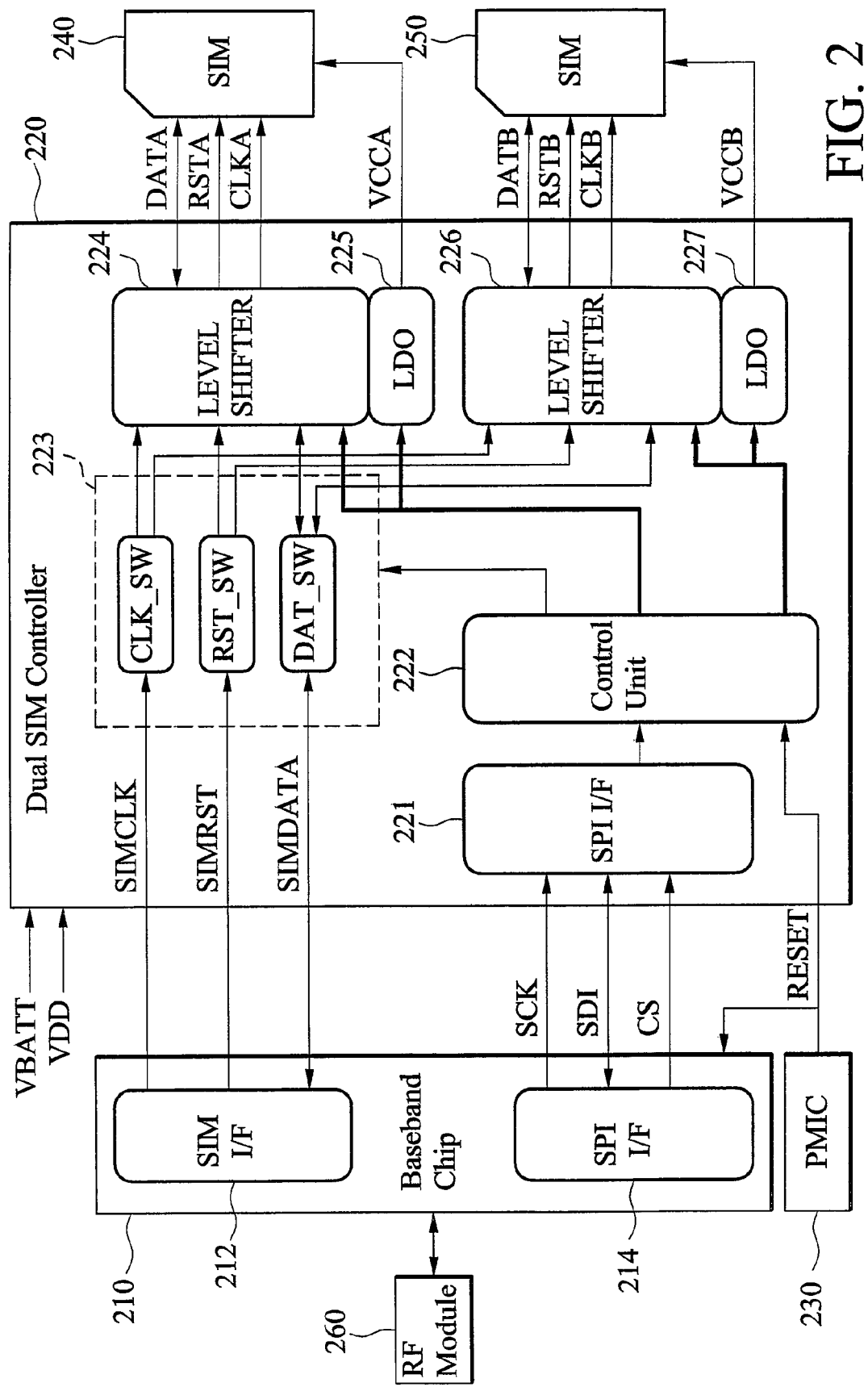
FIG. 2 shows a schematic diagram of a mobile station according to an embodiment of the invention.

FIG. 2 shows a schematic diagram of a mobile station according to an embodiment of the invention. A dual SIM controller 220 is coupled/connected between a Baseband chip 210 and two subscriber identity cards 240 and 250, and the dual SIM controller 220 is powered by the supplied voltages VBATT and VDD. The dual SIM controller 220 comprises a serial peripheral interface (SPI I/F) 221, a control unit 222, a switching circuit 223, two level shifters 224 and 226, and two regulators 225 and 227, wherein the switching circuit 223 comprises three switching units CLK_SW, RST_SW and DAT_SW. In an embodiment, each of the two regulators 225 and 227 may be a low dropout (LDO) regulator. The regulator 225 provides a voltage VCCA to the subscriber identity card 240 as an operating voltage of the subscriber identity card 240, and the regulator 227 provides a voltage VCCB to the subscriber identity card 250 as an operating voltage of the subscriber identity card 250. Moreover, a PMIC 230 generates a reset signal RESET to the Baseband chip 210 and the control unit 222 after the mobile station is powered-on.

Referring to FIG. 2, the Baseband chip 210 comprises a SIM interface 212 and a SPI I/F 214. The SIM interface 212 is coupled/connected to the switching circuit 223, and the relative signals between each of the two subscriber identity cards 240 and 250 and Baseband chip 210 are transmitted via the SIM interface 212. The SPI I/F 214 is coupled/connected to the SPI I/F 221, and the instructions from the Baseband chip 210 are transmitted to the control unit 222 via the SPI I/Fs 214 and 221, which comprise the CS, SCK, SDI and SDO ports.

Moreover, the level shifter 224 and the LDO 225 are coupled/connected to the subscriber identity card 240 which is used to camp on a cell (ex. a first cell) via an RF module 260, and the level shifter 226 and the LDO 227 are coupled/connected to the subscriber identity card 250 which is used to camp on another cell (ex. a second cell) via the RF module 260. The subscriber identity card 240 is coupled to the switching circuit 223 via the level shifter 224, which may shift the relative signals between the subscriber identity card 240 and the Baseband chip 210 to the suitable voltage levels. Furthermore, the subscriber identity card 250 is coupled to the switching circuit 223 via the level shifter 226, which may shift the relative signals between the subscriber identity card 250 and the Baseband chip 210 to the suitable voltage levels. When receiving an instruction indicating that the subscriber identity card 240 or the subscriber identity card 250 has been selected via the SPI I/Fs 214 and 221, the control unit 222 controls the switching circuit 223 to couple/connect the SIM I/F 212 to the selected subscriber identity card for enabling communication (such as the relative signals transmission) between the Baseband chip 210 and the selected subscriber identity card via the dual SIM controller 220. In this embodiment, the relative signals comprise the data signals (ex. SIM-DATA, DATA and DATB), reset signals (ex. SIMRST, RSTA and RSTB) and clock signals (ex. SIMCLK, CLKA and CLKB).

Figure 3A:
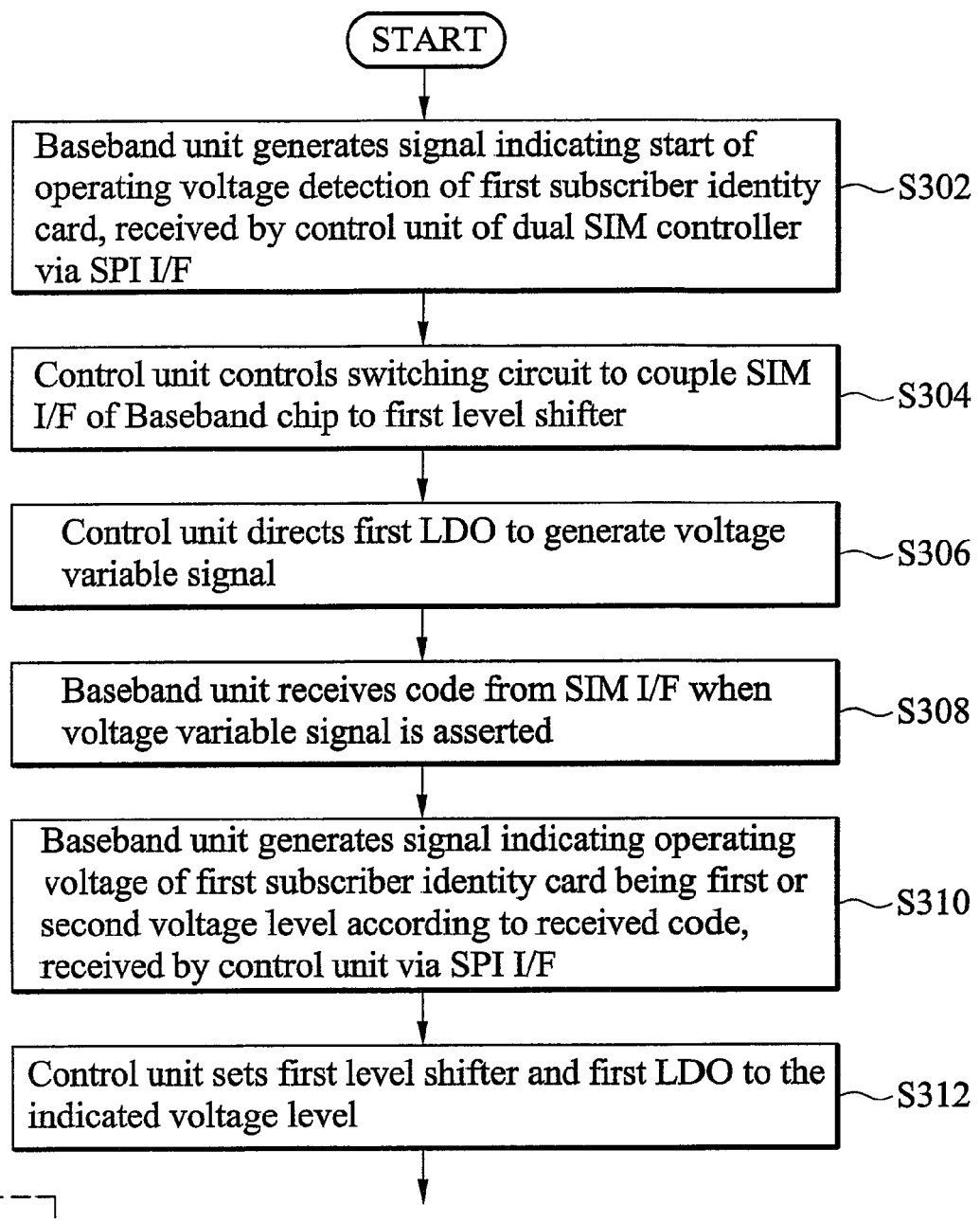
FIGS. 3A and 3B show an embodiment of a method for initiating operating voltages of subscriber identity cards in a mobile station.
Figure 3B:
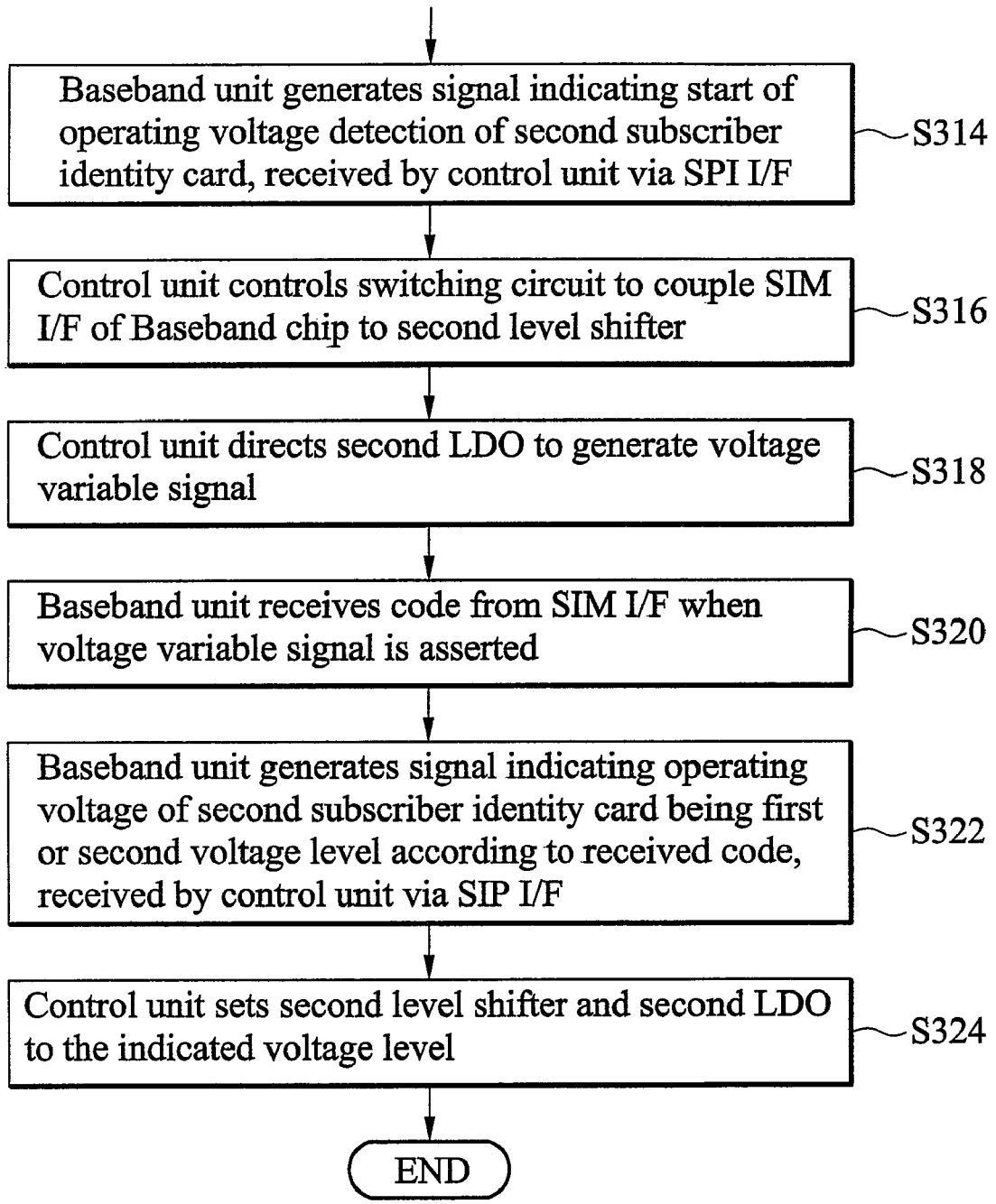
Figure 4A:
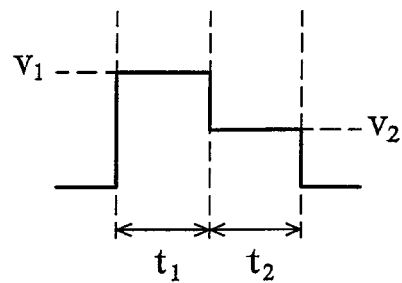
FIGS. 4A, 4B, 4C and 4D show the different waveforms of exemplary voltage variable signals.
Figure 4B:
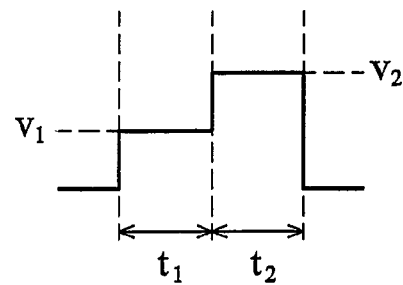
Figure 4C:
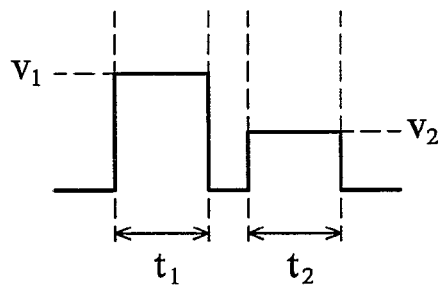
Figure 4D:
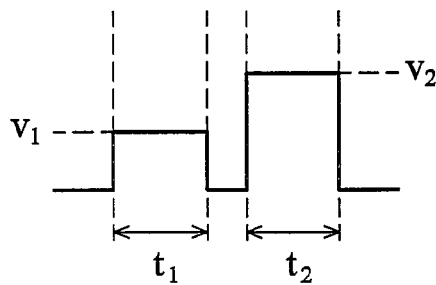

For the inserted subscriber identity cards may operate with different voltage levels, the mobile station detects an operating voltage of each inserted subscriber identity card and sets an operating voltage level of each level shifter and LDO to initiate the inserted subscriber identity cards after being powered-on. Referring to FIGS. 3A and 3B, an embodiment of a method for initiating operating voltages for subscriber identity cards of a mobile station is provided. Referring to FIG. 2, FIG. 3A and FIG. 3B together, assume each of the inserted subscriber identity cards 240 and 250 is operated with one of two voltage levels, for example, 3.0V and 1.8V. After being powered-on, the PMIC 230 generates the reset signal to the Baseband unit 210. Next, the Baseband unit 210 generates a first signal indicating start of operating voltage detection of the subscriber identity card 240 according to the reset signal (step S302), wherein the first signal is received by the control unit 222 of the dual SIM controller 220 via an interface between the Baseband unit 210 and the dual SIM controller 220. In an embodiment, the interface between the Baseband unit 210 and the dual SIM controller 220 is a Serial Peripheral Interface (SPI I/F). In another embodiment, the interface may be a general purpose input/output (GPIO) or a universal asynchronous receiver/transmitter (UART) interface or the like. The control unit 222 subsequently controls the switching circuit 223 to couple/connect the SIM I/F 212 of the Baseband unit 210 (such as terminals for outputting/inputting SIM-CLK, SIMRST and SIMDATA signals) to the level shifter 224 (step S304), and directs the LDO 225 to generate a voltage variable signal to the subscriber identity card 240 (step S306). The voltage variable signal is an analog signal with a first voltage level during a first time period and a second voltage level during a second time period. Refer to FIG. 4A, 4B, 4C or 4D for the waveform illustrating voltage level variations, where $v_1$ and $v_2$ represent the first and second voltage levels, respectively, and $t_1$ and $t_2$ represent the first and second time periods, respectively. In some embodiments, v1 may be 3V and v2 may be 1.8V shown in FIG. 4A or 4C. In some embodiments, v1 may be 1.8V and v2 may be 3V shown in FIG. 4B or 4D. During the first or second time period, when the voltage level of the voltage variable signal from the LDO 225 matches the operating voltage of the subscriber identity card 240, the subscriber identity card 240 transmits a code indicating that its operating voltage matches the voltage of the voltage variable signal to the Baseband unit 210 via the SIM interface 212 and the dual SIM controller 220 (step S308) such that the Baseband unit 210 can determine the operating voltage of the subscriber identity card 240. For an example of the subscriber identity card 240 operating at a voltage level of v2 shown in FIG. 4A, 4B, 4C or 4D, during the second time period, the subscriber identity card 240 transmits a code indicating that its operating voltage matches the voltage of the voltage variable signal to the Baseband unit 210. According to the received code, the Baseband unit 210 generates a setting signal indicating that the operating voltage of the subscriber identity card 240 is the first or second voltage level to the control unit 222 via the SPI I/F (step S310). Next, the control unit 222 sets the level shifter 224 and the LDO 225 to the indicted voltage level (i.e. the first or second voltage level) according to the setting signal from the Baseband unit 210 (step S312). After the voltage level settings of the level shifter 224 and the LDO 225 are performed, the suitable operating voltage is provided to the subscriber identity card 240 such that the subscriber identity card 240 can operate with the Baseband unit 210 to camp on the first cell and communicate with a corresponding node (CN) via the camped on cell.

After detecting and setting the operating voltage of the subscriber identity card 240, the Baseband unit 210 generates a second signal indicating start of operating voltage detection of the subscriber identity card 250 (step S314), wherein the second signal is received by the control unit 222 via the SPI I/F. Next, the control unit 222 controls the switching circuit 223 to couple/connect the SIM I/F 212 to the level shifter 226 (step S316), and directs the LDO 227 to generate the voltage variable signal to the subscriber identity card 250 (step S318). Next, the Baseband unit 210 receives a code from the subscriber identity card 250 via the SIM interface 212 and the dual SIM controller 220 when the voltage variable signal is asserted and the voltage level of the voltage variable signal from the LDO 227 matches the operating voltage of the subscriber identity card 250 (step S320), wherein the code indicates that the operating voltage of the subscriber identity card 250 matches the voltage of the voltage variable signal. For an example of the subscriber identity card 250 operating at a voltage level of v1 shown in FIG. 4A, 4B, 4C or 4D, during the first time period, the subscriber identity card 250 transmits a code indicating that its operating voltage matches the voltage of the voltage variable signal to the Baseband unit 210. According to the received code, the Baseband unit 210 generates a setting signal indicating that the operating voltage of the subscriber identity card 250 is the first or second voltage level to the control unit 222 via the SPI UF (step S322). Next, the control unit 222 sets the level shifter 226 and the LDO 227 to the indicted voltage level according to the setting signal (step S324). After the voltage level settings of the level shifter 226 and the LDO 227 are performed, the suitable operating voltage is provided to the subscriber identity card 250 such that the subscriber identity card 250 can operate with the Baseband unit 210 to camp on the second cell and communicate with an CN via the camped on cell.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system with a first subscriber identity card, a second subscriber identity card and a radio frequency (RF) module, comprising:
   a controller initiating a first operating voltage of the first subscriber identity card and initiating a second operating voltage of the second subscriber identity respectively, and
   a Baseband unit cooperating with the first subscriber identity card to camp on a first cell and cooperating with the second subscriber identity card to camp on a second cell via the RF module,
   wherein the controller provides a voltage variable signal to the first subscriber identity card and the second subscriber identity card and receives a first code from the first subscriber identity card and a second code from the second subscriber identity card when the voltage variable signal is asserted, and the Baseband unit provides a first setting signal corresponding to the first code to initiate the first operating voltage of the first subscriber identity card, and provides a second setting signal corresponding to the second code to the controller to initiate the second operating voltage of the second subscriber card.

2. The system as claimed in claim 1, wherein the voltage variable signal is an analog signal with a first voltage level during a first time period and a second voltage level during a second time period.

3. The system as claimed in claim 2, wherein a voltage level of the first operating voltage is equal to the first or second voltage level, and a voltage level of the second operating voltage is equal to the first or second voltage level.

4. The system as claimed in claim 1, wherein the first code is transmitted from the first subscriber identity card to the Baseband unit via a subscriber identity module (SIM) interface when a voltage level of the voltage variable signal provided to the first subscriber identity card matches that of operating voltage of the first subscriber identity, and the second code is transmitted from the second subscriber identity card to the Baseband unit via the SIM interface when the voltage level of the voltage variable signal provided to the second subscriber identity card matches that of operating voltage of the second subscriber identity.

5. The system as claimed in claim 1, wherein the controller comprises:
   a first regulator coupled to the first subscriber identity card;
   a second regulator coupled to the second subscriber identity card; and
   a control unit setting the first regulator according to the first setting signal to provide the first operating voltage to the first subscriber identity card, and setting the second regulator according to the second setting signal to provide the second operating voltage to the second subscriber identity card.

6. The system as claimed in claim 5, wherein each of the first and second regulators is a low dropout (LDO) regulator.

7. The system as claimed in claim 5, wherein the controller further comprises:
   a first level shifter coupled to the first subscriber identity card; and
   a second level shifter coupled to the second subscriber identity card,
   wherein the control unit sets the first level shifter to a voltage level of the first operating voltage according to the first setting signal, and sets the second level shifter to a voltage level of the second operating voltage according to the second setting signal.

8. The system as claimed in claim 7, wherein the controller further comprises a switching circuit, which is controlled by the control unit to selectively couple a subscriber identity module (SIM) interface of the Baseband unit to one of the first and second level shifters.

9. The system as claimed in claim 8, wherein the switching circuit is controlled to couple the SIM interface of the Baseband unit to the first level shifter before the controller provides the voltage variable signal to the first subscriber identity card, and the switching circuit is controlled to couple the SIM interface of the Baseband unit to the second level shifter before the controller provides the voltage variable signal to the second subscriber identity card.

10. The system as claimed in claim 8, wherein the first setting signal and the second setting signal are transmitted from the Baseband unit to the controller via a serial peripheral interface (SPI) interface.

11. The system as claimed in claim 1, further comprising a power management unit, wherein after receiving a reset signal from the power management unit the Baseband unit informs the controller of start of initiation of the first operating voltage and the second operating voltage.

12. The system as claimed in claim 1, wherein each of the first subscriber identity card and the second subscriber identity card stores a subscriber identity being a unique number associated with a wireless telecommunication system.

13. A method for initiating operating voltages of a first subscriber identity card and a second subscriber identity card of a mobile station, the mobile station further comprising a Baseband unit and an RF module, the method comprising:
   coupling the Baseband unit to the first subscriber identity card and providing a voltage variable signal to the first subscriber identity card;
   receiving a first code from the first subscriber identity card when the voltage variable signal is provided to the first subscriber identity card;
   providing a first operating voltage corresponding to the first code to the first subscriber identity card;
   coupling the Baseband unit to the second subscriber identity card and providing the voltage variable signal to the second subscriber identity card after the first operating voltage is provided;
   receiving a second code from the second subscriber identity card when the voltage variable signal is provided to the second subscriber identity card; and providing a second operating voltage corresponding to the second code to the second subscriber identity card;

wherein the voltage variable signal is an analog signal with a first voltage level during a first time period and a second voltage level during a second time period, a voltage level of the first operating voltage is equal to the first or second voltage level, and a voltage level of the second operating voltage is equal to the first or second voltage level.

14. The method as claimed in claim 13, wherein the first code is received by the Baseband unit when a voltage level of the voltage variable signal provided to the first subscriber identity card matches that of operating voltage of the first subscriber identity card, and the second code is received by the Baseband unit when the voltage level of the voltage variable signal provided to the second subscriber identity card matches that of operating voltage of the second subscriber identity card.

15. The method as claimed in claim 13, wherein the step of providing the first operating voltage further comprises using a first regulator of the mobile station to provide the first operating voltage according to the first code, and the step of providing the second operating voltage further comprises using a second regulator of the mobile station to provide the second operating voltage according to the second code.

16. The method as claimed in claim 15, wherein the step of coupling the Baseband unit to the first subscriber identity card and providing the voltage variable signal to the first subscriber identity card further comprises using the first regulator of the mobile station to generate the voltage variable signal, and the step of coupling the Baseband unit to the second subscriber identity card and providing the voltage variable signal to the second subscriber identity card further comprises using the second regulator of the mobile station to generate the voltage variable signal.

17. A method for initiating operating voltages of a first subscriber identity card and a second subscriber identity card of a mobile station, the mobile station further comprising a Baseband unit, a controller and an RF module, the method comprising:

providing a first signal from the Baseband unit to the controller via a first interface;

coupling a second interface of the Baseband unit to the first subscriber identity card by the controller after the first signal is provided;

providing a voltage variable signal to the first subscriber identity card by a first regulator of the controller when the second interface of the Baseband unit is coupled to the first subscriber identity card;

receiving a first code from the first subscriber identity card by the Baseband unit via the second interface when the voltage variable signal is provided to the first subscriber identity card;

performing voltage level settings to the first regulator and a first level shifter according to the first code, wherein the first regulator and the first level shifter are coupled to the first subscriber identity card;

providing a second signal from the Baseband unit to the controller via the first interface after the voltage level settings of the first regulator and the first level shifter are completely performed;

coupling the second interface of the Baseband unit to the second subscriber identity card by the controller after the second signal is provided;

providing the voltage variable signal to the second subscriber identity card by a second regulator of the controller when the second interface of the Baseband unit is coupled to the second subscriber identity card;

receiving a second code from the second subscriber identity card by the Baseband unit via the second interface when the voltage variable signal is provided to the second subscriber identity card; and performing voltage level settings to the second regulator and a second level shifter according to the second code, wherein the second regulator and the second level shifter are coupled to the second subscriber identity card;

wherein the voltage variable signal is an analog signal with a first voltage level during a first time period and a second voltage level during a second time period, and a voltage level of the first operating voltage is equal to the first or second voltage level, and a voltage level of the second operating voltage is equal to the first or second voltage level.

18. The method as claimed in claim 17, wherein the first interface is a Serial Peripheral Interface (SPI I/F) and the second interface is a Subscriber Identity Module Interface (SIM I/F).

19. The method as claimed in claim 17, wherein the step of performing the voltage level settings to the first regulator and the first level shifter further comprises:

determining a first operating voltage of the first subscriber identity card by the Baseband unit according to the first code; and transmitting a first setting signal with information regarding the determined first operating voltage to the controller via the first interface to set the first regulator and the first level shifter to a voltage level of the first operating voltage, and the step of performing the voltage level settings to the second regulator and the second level shifter further comprises:

determining a second operating voltage of the second subscriber identity card by the Baseband unit according to the second code; and transmitting a second setting signal with information regarding the determined second operating voltage to the controller via the first interface to set the second regulator and the second level shifter to a voltage level of the second operating voltage.

20. The method as claimed in claim 17, wherein the first signal is provided after being powered-on.

* * * * *